United States Patent
Block et al.

[11] Patent Number: 6,167,016
[45] Date of Patent: *Dec. 26, 2000

[54] OPTICAL HEAD WITH A DIFFRACTIVE LENS FOR FOCUSING A LASER BEAM

[75] Inventors: Barry Block, Los Altos; Arnold Thorton, San Jose, both of Calif.

[73] Assignee: Aerial Imaging Corporation, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/833,608

[22] Filed: Apr. 11, 1997

[51] Int. Cl.[7] .................................................. G11B 7/125
[52] U.S. Cl. ........................ 369/109; 369/44.15; 369/112; 369/44.23; 369/44.16
[58] Field of Search .................................. 369/109, 44.23, 369/44.34, 112, 126, 44.12, 44.16, 44.14, 44.15

[56] References Cited

U.S. PATENT DOCUMENTS

| | | | |
|---|---|---|---|
| 4,733,943 | 3/1988 | Suzuki et al. | 350/162.16 |
| 4,802,042 | 1/1989 | Strom | 360/103 |
| 4,870,632 | 9/1989 | Shiono et al. | 369/44 |
| 4,939,604 | 7/1990 | Fukuda et al. | 360/103 |
| 5,062,017 | 10/1991 | Strom et al. | 360/103 |
| 5,105,408 | 4/1992 | Lee et al. | 369/44.15 |
| 5,121,378 | 6/1992 | Hirose et al. | 369/112 |
| 5,136,424 | 8/1992 | Cox et al. | 359/394 |
| 5,349,592 | 9/1994 | Andó | 372/32 |
| 5,351,229 | 9/1994 | Brezoczky et al. | 369/99 |
| 5,481,386 | 1/1996 | Shimano et al. | |
| 5,497,359 | 3/1996 | Mamin et al. | 369/44.15 |
| 5,541,908 | 7/1996 | Hsu et al. | 369/244 |
| 5,644,420 | 7/1997 | Nakane | 359/245 |
| 5,646,928 | 7/1997 | Wu et al. | 369/112 |
| 5,687,155 | 11/1997 | Fukakusa et al. | |
| 5,715,226 | 2/1998 | Shimano et al. | 369/112 |
| 5,734,632 | 3/1998 | Ito et al. | 369/44.23 |

FOREIGN PATENT DOCUMENTS

| | | |
|---|---|---|
| 1289180 | 9/1991 | Canada . |
| 0 226 647 A1 | 1/1987 | European Pat. Off. . |
| 0 458 445 | 11/1991 | European Pat. Off. . |
| 0 576 803 | 1/1994 | European Pat. Off. . |
| 0 668 014 A1 | 12/1995 | European Pat. Off. . |
| 0 814 468 A1 | 12/1997 | European Pat. Off. . |
| 44 04 635 A1 | of 0000 | Germany . |

OTHER PUBLICATIONS

Sales, et al., "Diffractive Supperresolution Elements", J. Opt. Soc. Am. A, vol. 14, No. 7, Jul. 1997, pp. 1637–1646.

Cox et al., "Reappraisal of Arrays of Concentric Annuli as Superresolving Filters", J. Opt. Soc. Am., vol. 72, No. 9, Sep. 1982, pp. 1287–1291.

Francia, "Nuove Pupille Superrisolventi", Atti Della Fondazione"Giorgio Ronchi,, Jan.–Feb. 1952, pp. 366–372.

Däschner, et al., "Cost Effective Mass Fabrication of Multilevel Diffractive Optical Elements Using a Single Optical Exposure with a Gray–Scale Mask On High Energy Beam Sensitive Glass", University of California San Diego, Department of Electrical and Computer Engineering, pp. 1–22.

Fowles, "Introduction to Modern Optics", Dover Publications, Inc. New York, pp. 128–129, 140–145.

(List continued on next page.)

*Primary Examiner*—Tan Dinh
*Assistant Examiner*—Kim-Kwok Chu

[57] ABSTRACT

A head slider for flying above a rotating magneto-optic or optical disk and an optical mechanical assembly with a fixed height above a rotating magneto-optic or optical disk contains magnetic coils and a lens plate with a diffractive optic structure for focusing laser light into a small spot on the disk. The diffractive optic structure may be a zone plate, a phase zone plate or a blazed phase zone plate or other diffractive focusing optical element. The diffractive optic structure does not require curved transparent material such as glass or a high index of refraction. The diffractive optic structure is easily manufactured using lithographic or other techniques.

34 Claims, 15 Drawing Sheets

OTHER PUBLICATIONS

Meyer–Arendt, "Introduction to Classical and Modern Optics", Prentice–Hall, Inc., Englewood Cliffs, N.J. pp., 200–202, 241–242.

"A Single All–Glass Phototool Replaces Five Binary Chrome Masks for 3D Shaping", Herbs–Glass Photomask Blanks, CMI Product Information No. 96–01, User's Manual, pp. 1–15.

"A Single All–Glass Phototool Replaces Five Binary Chrome Masks for 3D Shaping", Herbs–Glass Photomask Blanks, CMI Product Information No. 94–88S.

Eric Nee, "Trillion of Bytes", Forbes, Mar. 24, 1997.

Suleski et al., "Gray–Scale Masks for Diffractive–Optics Fabrication: I. Commercial Slide Imagers" Applied Optics, Nov. 10, 1995, pp. 7507–7517.

OPTICAL HEAD WITH A DIFFRACTIVE LENS FOR FOCUSING A LASER BEAM

FIELD OF THE INVENTION

This invention relates to lenses for focusing laser beams. An object of this invention is to provide an improved lens for focusing laser light into a small spot on magneto-optic or optical disks.

BACKGROUND OF THE INVENTION

Data is written on a magneto-optic or optical disk by placing a small spot of light on the magneto-optic or optical layer on the surface of the disk. The smaller the spot of light, the more data that may be written per unit area on the disk. Thus, there is incentive to create a smaller, more focused spot on the magneto-optic optical layer of the disk.

As an example, a head slider with a refractive lens flies above a magneto-optic disk which is mounted on a spindle driven by a motor to rotate the disk at high speed. The head slider flies over the surface of the disk in a manner similar to a read/write head, as described in U.S. Pat. No. 5,497,359, to H. Mamim et al., issued on Mar. 5, 1996. The refractive lens focuses light from a laser into a spot on the surface of the disk. FIGS. 1A and 1B show a head slider 10 with a refractive lens 12. Head 10 has an air bearing surface 14 that provides the necessary lift to head 10 as it flies above the disk.

As another example, an optical mechanical assembly ("OMA") with a refractive lens, such as the type used in compact disk drives or magneto-optic devices, remains at a constant height above a rotating disk. FIG. 2 shows an OMA 16, with refractive lens 18, positioned on an actuator carriage device 20 over an optical disk 22, such that OMA 16 is at a fixed height over optical disk 22. Refractive lens 18 focuses light onto a spot on the surface of disk 22.

SUMMARY

A head slider with a lens utilizes a diffractive optic structure to produce a sub-Airy disk or "spot" on the central maximum diffractive pattern. An Airy spot is the central region of focused high intensity light created by a circular aperture. In one embodiment, the head slider and lens module carries, among other elements magnetic coils and electrical leads from the coils which connect to the other side of the head. The diffractive optic structure is typically a zone plate, a phase zone plate, or a blazed phase zone plate. The diffractive optic structure may be either on the top surface or bottom surface of the lens. The lens may be mounted on an actuator carrier such that it remains at a constant height above the disk or may be coupled with a head slider and flown over the disk.

The diffractive lens has the following advantages:
1) The lens need not include any curved optical surfaces, and is thus easy to manufacture;
2) The lens may have a high numerical aperture and thus a small spot size;
3) The lens does not require the use of a high index of refraction glass;
4) The lens has multiple focal lengths and is free from small focal length requirements, thus freeing the slider head from low flying requirements; and
5) The lens provides a very small focused spot.

DETAILED DESCRIPTION

Figure 1A:
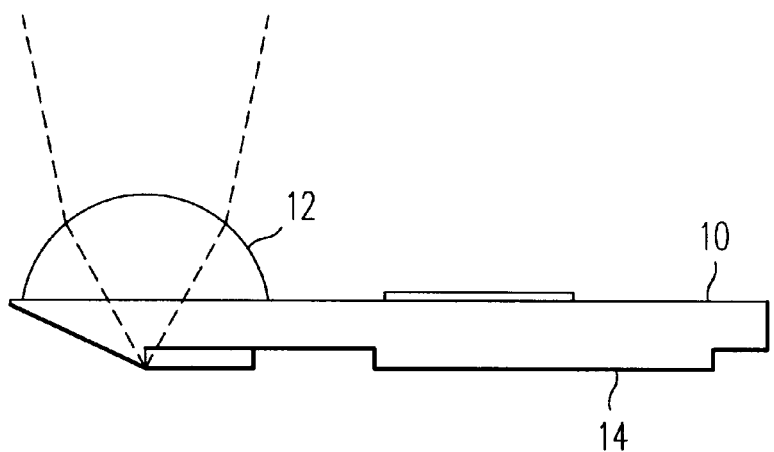
FIGS. 1A and 1B illustrate a prior art head slider with a refractive lens.
Figure 1B:
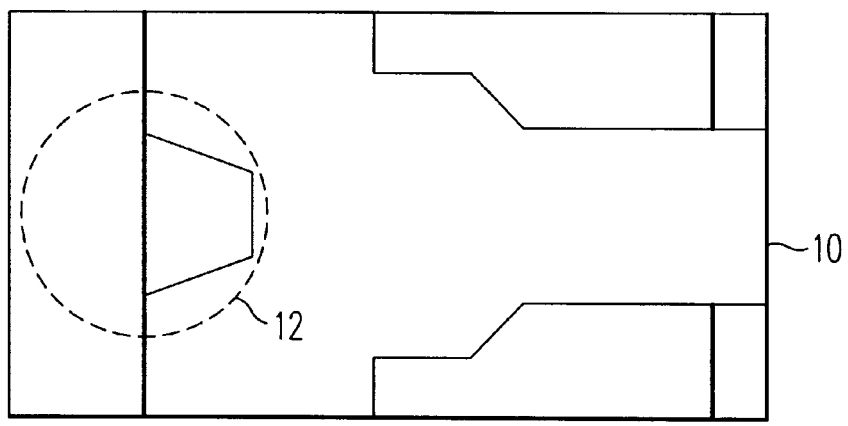
Figure 2:
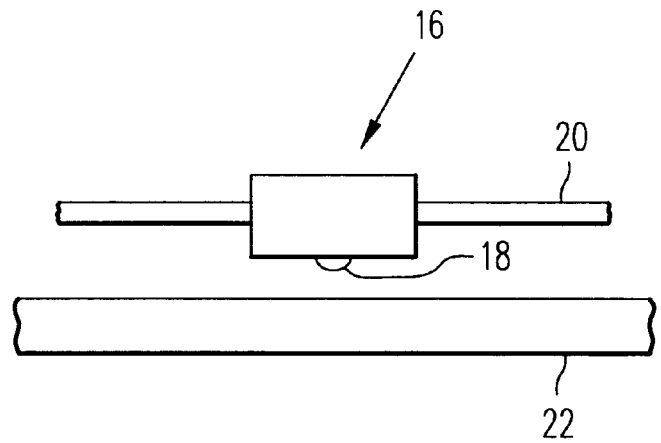
FIG. 2 illustrates a prior art optical mechanical assembly with a refractive lens positioned on an actuator carriage over a disk.
Figure 3:
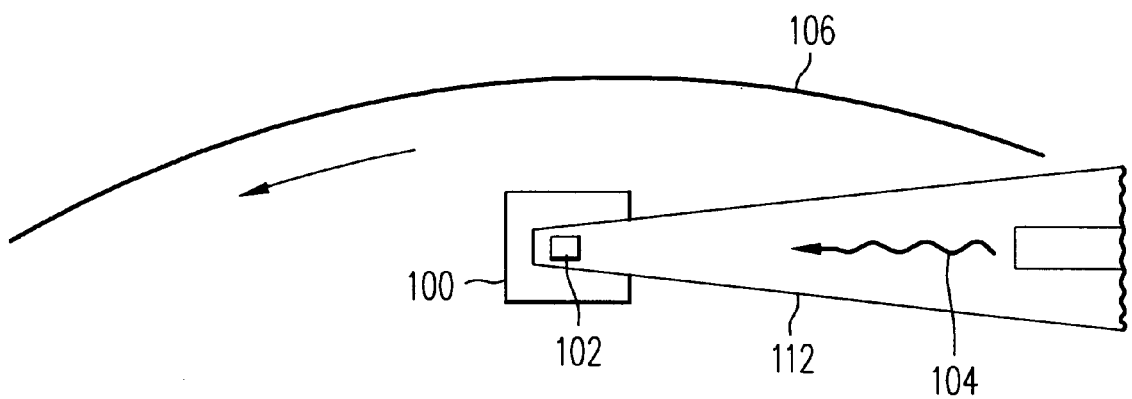
FIG. 3 illustrates a head slider with a lens attached to a suspension arm over a spinning disk.

FIG. 3 shows a head slider 100 with a lens module 102 for focusing light from a laser beam 104 onto a surface such as a rotating magneto-optic or optical disk 106. Laser beam 104 is a conventional laser beam and will not be discussed in further detail.

Figure 4:
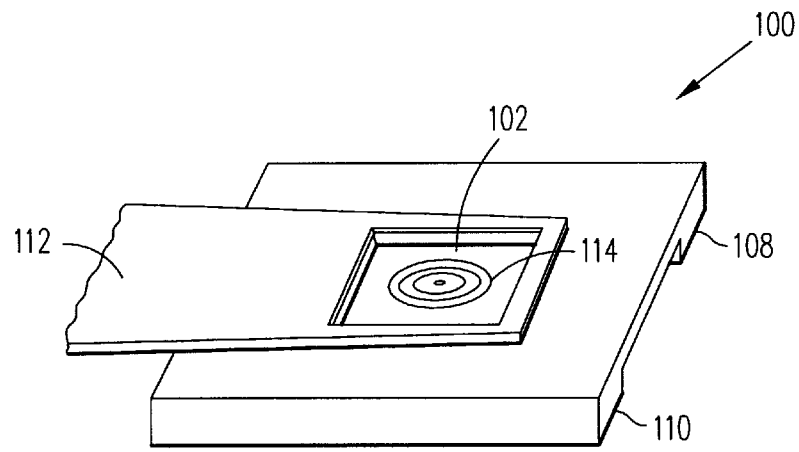
FIG. 4 illustrates a head slider with a lens containing a diffractive optic structure in accordance with the invention.

FIG. 4 shows head slider 100, which "flies" above disk 106 in much the same way that a magnetic read-write head flies above a magnetic disk. The bottom of head 100 includes rails 108 and 110, which serve as air bearing surfaces to provide lift to head 100 during use.

Head 100 may be mounted on a suspension arm 112, such as the type manufactured by Magnecom Corp. in Temecula, Calif., a Hutchinson suspension, to hold head 100 in close proximity to disk 106 during use, as shown in FIG. 3. Head 100 may also be contained in a feedback module to adjust focus and tracking on an information bearing disk. Head 100 may fly at any height above disk 106 during use, typically less than 40 microinches.

Figure 5:
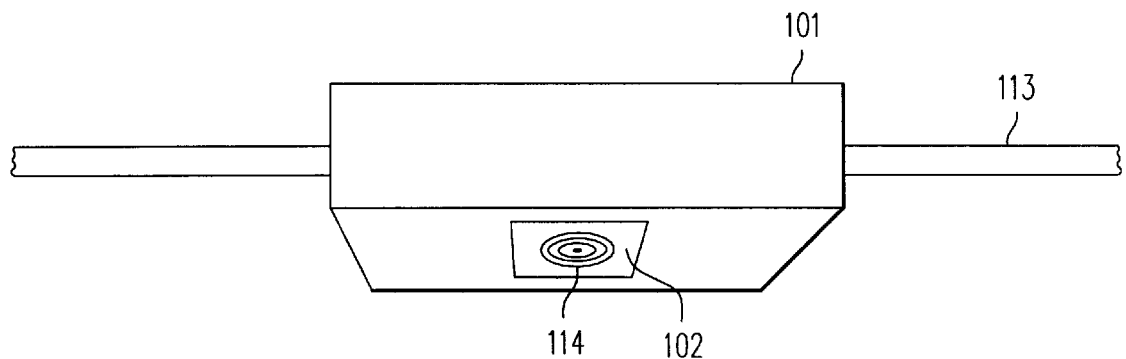
FIG. 5 illustrates an optical mechanical assembly with a diffractive lens in accordance with the invention.

FIG. 5 shows the bottom of an optical mechanical assembly ("OMA") 101 attached to an actuator carriage 113. OMA 101 is fixed above a disk (not shown) at a constant height, typically at a height of 1 mm.

FIGS. 4 and 5 also show lens module 102, which has a diffractive optic structure 114 on one surface of lens module 102. Lens module 102 may be either built into head slider 100 or OMA 101, or module 102 may be manufactured separately and mounted to head slider 100 or OMA 101. Diffractive optic structure 114 may be on either the top surface or bottom surface of lens module 102. Diffractive optic structure 114, by way of example, can be a zone plate, phase zone plate, or blazed phase zone plate. Diffractive optic structure 114 may be lithographically constructed so that structure 114 produces a diffraction limited Airy spot. Further improvements of the diffractive optic structure 114 to produce a spot smaller than the Airy spot are possible, such as occluding areas of optic structure 114, or increasing the number of zones. Such sub-Airy diffraction spots are advantageous to the overall performance of the magneto-optic or optical disk drive as the sub-Airy spot increases the bit density on disk 106.

Figure 6:
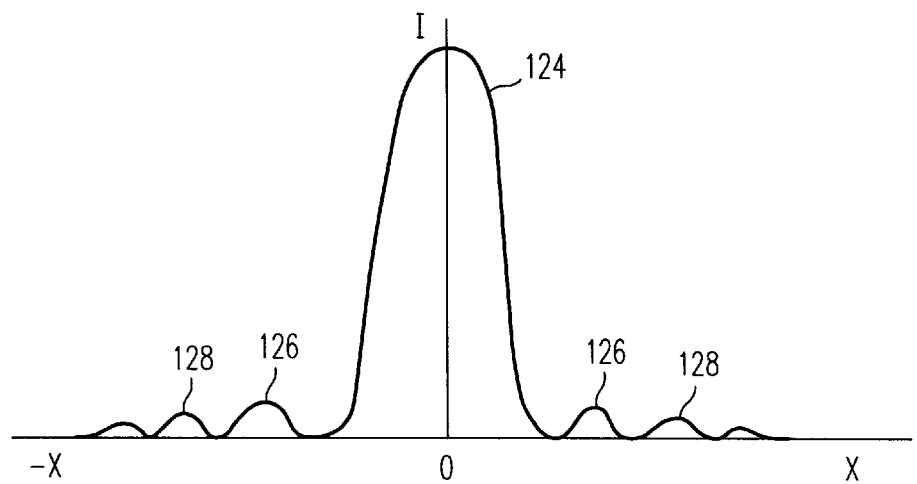
FIG. 6 illustrates an Airy spot pattern created by a circular aperture.

An Airy spot is created by diffraction at a circular aperture. The Airy spot is the central maximum corresponding to a high-irradiance circular spot, where the radius of the spot is calculated by the following equation using the conventional Rayleigh criterion:

$$\text{radius} = 1.22 \frac{f\lambda}{D} \quad (1)$$

where f is the focal length, $\lambda$ is the wavelength of light, and D is the diameter of the aperture. An example of an Airy pattern is shown in FIG. 6, where the vertical axis is a measure of irradiance and the horizontal axis is distance from the center of the high central maximum. The Airy spot is represented by the high central maximum 124. Outside the Airy spot are a series of diffraction rings having decreasing amplitudes such as the first diffraction ring 126 and second diffraction ring 128.

Figure 7:
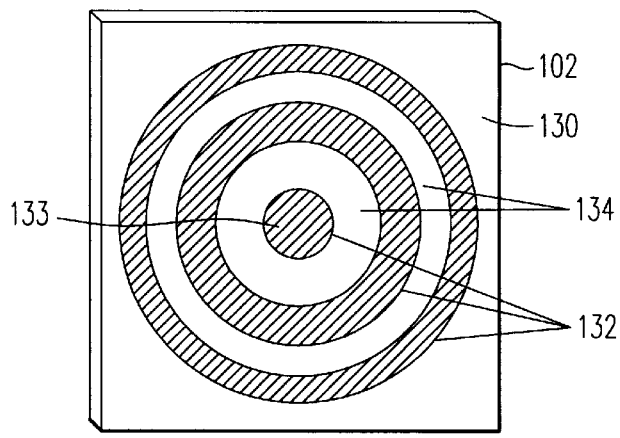
FIG. 7 illustrates in plan view a zone plate lens.

Diffractive optic structure 114, in one embodiment, is a zone plate lens as shown in FIG. 7. A zone plate 130 comprises a series of concentric alternating opaque and transparent regions 132, 134, respectively, which diffract and focus light into a small area The zone plate performance is improved, i.e., the central maximum radius of the Airy spot is decreased, by occluding (i.e., making opaque) a central area 133 of zone plate 130 as shown in FIG. 7. The larger the occluded or opaque area 133, the smaller the radius of the central maximum of the diffraction pattern. With seventy to eighty percent of the central area 133 of zone plate 130 occluded, the radius of the central maximum of the diffraction pattern will be decreased by approximately a factor of two. However, the first diffraction ring maximum becomes larger, so a trade off is necessary depending on the application.

Figure 8:
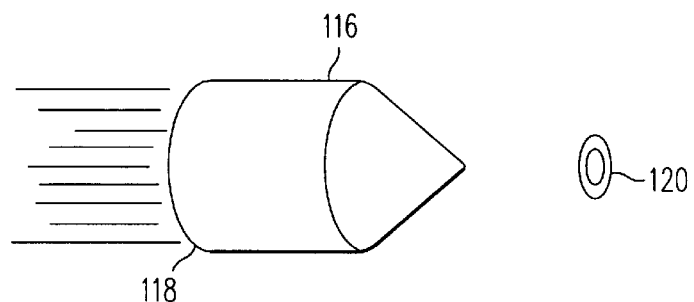
FIG. 8 illustrates an optic structure containing an axicon lens to optimize the light intensity on a zone plate lens.
Figure 9A:
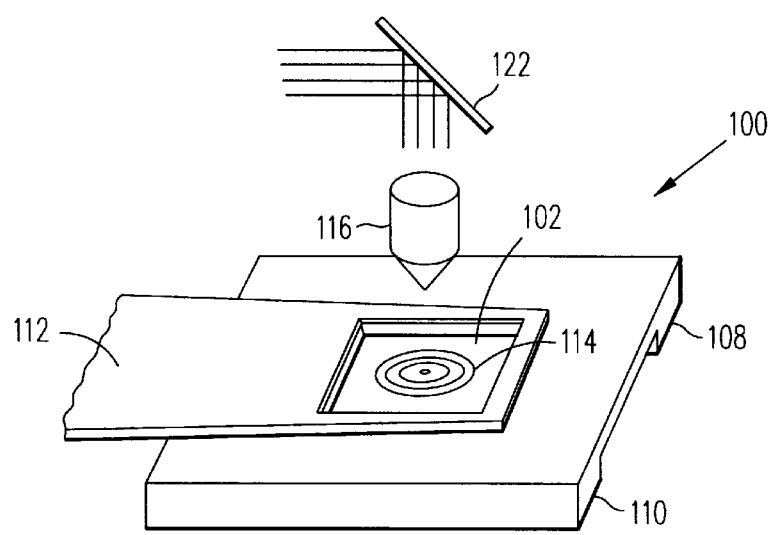
FIG. 9A illustrates an assembled head slider with a zone plate lens and an optic structure to optimize the light intensity incident on the zone plate.
Figure 9B:
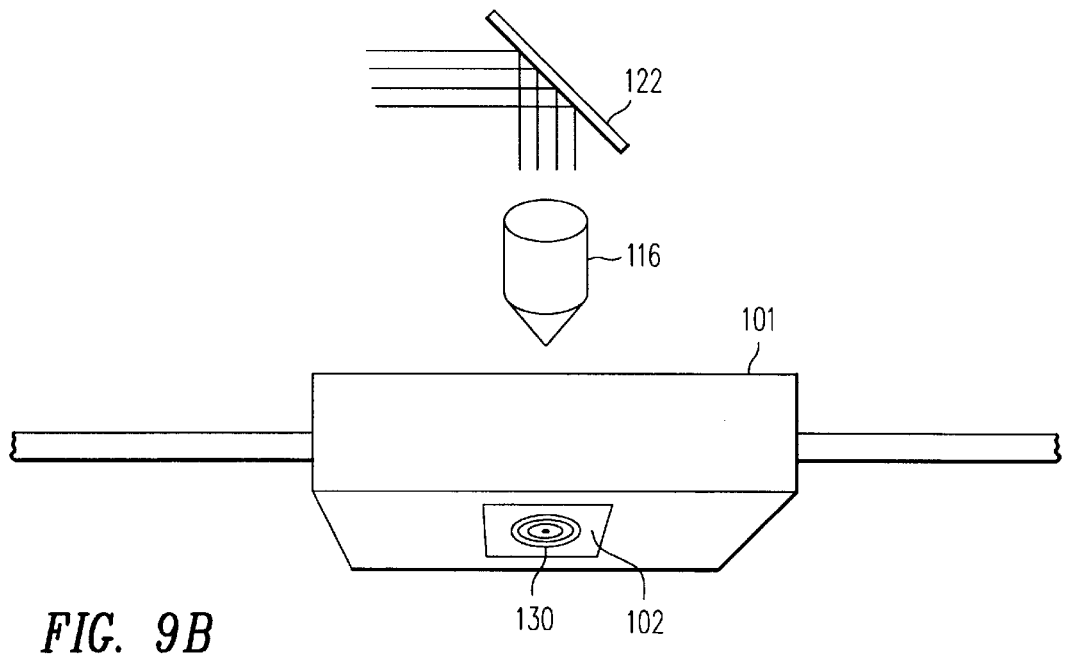
FIG. 9B illustrates an assembled optical mechanical assembly with a zone plate lens and an optic structure to optimize the light intensity incident on the zone plate.

Because central area 133 is occluded, the light incident on zone plate 130 is preferably not uniform or the portion falling on the occluded central area 133 will be lost. In order to maximize the transfer of light power to zone plate 130, the incident light should be ring-shaped and matched to zone plate 130. An optic structure, as shown in FIG. 8, such as axicon lens 116 or a similar acting diffraction lens, will create an illuminated ring of light 120 on the real image plane when the entrance side 118 (object plane) is uniformly illuminated. The ring structure 120 may be matched to zone plate 130. The assembled head slider structure is shown in FIG. 9A with a plane mirror 122, axicon lens 116, and lens module 102 with zone plate 130 on head 100 attached to suspension arm 112. The assembled OMA structure is shown in FIG. 9B with a plane mirror 122, axicon lens 116, and lens module 102 with zone plate 130 on head 101. The holder for plane mirror 122 and axicon lens 116 is not shown in FIGS. 9A and 9B for clarity. The net result of the structures in FIGS. 9A and 9B is to take incident plane parallel laser light and create a ring-shaped source to illuminate zone plate 130. Zone plate 130 then focuses the light into a sub-Airy diameter central maximum spot on the disk.

As described below, lens module 102 with zone plate 130 comprises a flat, thin, transparent material such as fused silica, with concentric regions of opaque material, such as chromium or a chromium alloy, deposited therein. The chromium can be patterned using conventional lithographic techniques. Of course, other transparent and opaque materials may be used.

The following will describe the general properties of zone plates, phase zone plate, and blazed phase zone plates, which are relevant to this embodiment. Zone plates will be referred to for ease of reference. The theory of zone plates yields the following formulas.

Figure 10:
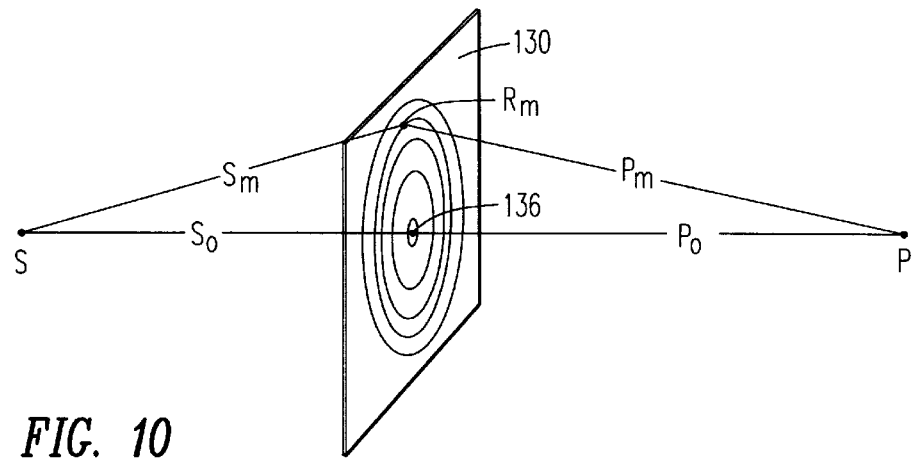
FIG. 10 illustrates possible paths of light from a source passing through a zone plate lens to a focus point.

The radii of the zones in a zone plate may be calculated in the following manner. FIG. 10 illustrates a light wave traveling from source S to zone plate lens 130 to the focal point P. Two possible paths of the light wave are shown in FIG. 10. In one path, the light wave travels along segment $S_0$, from source S to the center 136 of zone plate 130, then travels along segment $P_0$ to focal point P. In the other path, the light wave travels along segment $S_m$, from the source S to the outer edge of the m'th zone $R_m$, then travels along segment $P_m$ to focal point P. Waves traveling these separate paths will arrive at focal point P $m\pi/2$ out of phase with each other, where m is the number of zones from the center. Accordingly:

$$(S_m + P_m) - (S_0 + P_0) = \frac{m\lambda}{2} \quad (2)$$

where $\lambda$ is the wavelength of light. From inspection of FIG. 10, it can be seen that:

$$S_m = (S_0^2 + R_M^2)^{1/2}; \quad P_m = (P_0^2 + R_m^2)^{1/2} \quad (3)$$

The expressions of equation 3 may be expanded using the binomial series. Assuming that $R_m$ is small compared to $S_0$ and $P_0$, only the first two terms need to be retained, which yields:

$$S_m = S_0 + \frac{R_m^2}{2S_0}; \quad P_m = P_0 + \frac{R_m^2}{2P_0} \quad (4)$$

Substituting equation 4 into equation 2 yields the result:

$$\left(\frac{1}{S_0} + \frac{1}{P_0}\right) = \frac{m\lambda}{R_m^2} \quad (5)$$

If $S_0$ is large, equation 5 reduces to:

$$R_m^2 = m\lambda P_0 \quad (6)$$

The primary focal length f, the light wavelength $\lambda$ and the radius of the first zone $R_1$ are related:

$$f = \frac{R_1^2}{\lambda}. \quad (7)$$

As can be seen from equation 7, the focal length is adjustable. Further, a diffractive optic structure has multiple focal lengths, located for instance at distances f, f/3, f/5, f/7, the irradiance for a standard zone plate is considerably lessened at focal points closer than the primary focal point f, which is equal to $P_0$. However, the spot created at sub-primary focal lengths is also decreased in size.

Thus, the radius of the m'th zone $R_m$, where m is an integer m=1, 2, 3; is as follows:

$$R_m = R_1 \sqrt{m} \quad (8)$$

The radius of the primary focal length spot size is approximately:

$$\text{radius} = \frac{\lambda}{D} f \quad (9)$$

where D is the diameter of the largest zone in the zone plate, i.e., $2R_{max}$. This primary spot size is an important parameter impacting the amount of data that can be stored per unit area on an magneto-optic or optical layer. The smaller the spot size, the more information that may be stored per unit area.

As an example, for a primary focal length f=15 micrometers (i.e., microns), $\lambda$=0.65 microns and 400 zones, i.e., $m_{max}$=400. The above formulas give:

$R_1$=3.123 microns $R_{max}$=62.45 microns spot size radius=0.078 microns

As discussed above, these results may be improved by occluding center zone 133. Thus, the use of a zone plate may yield a very small spot size.

Figure 11A:
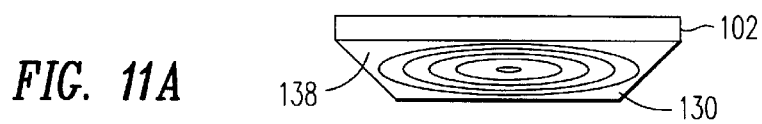
FIGS. 11A and 11B illustrate a zone plate on the bottom surface and the top surface, respectively, of a lens module.

Zone plate 130 may be located on the bottom surface 138 of lens module 102 as shown in FIG. 11A. In this configuration, the transparent material used for lens module 102 can be fused silica, borosilicate, or other glasses. This configuration is free from both a requirement for a high index of refraction glass and a fly height requirement because diffractive optical structures have an adjustable focal length. Because this configuration does not have a fly height restriction, the distance between the lens module 102 and the magneto-optic or optical layer may be large, e.g., 150 microns. Thus, head sliders with low flying heights are unnecessary and OMA's may be used.

Figure 11B:
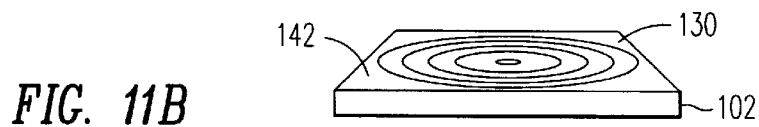

In an alternative embodiment, as shown in FIG. 11B, zone plate 130 may be placed on the top surface 142 of lens module 102. With zone plate 130 on top surface 142, the focal point of zone plate 130 can be designed to be on the bottom surface 138 of lens module 102. This embodiment produces evanescent waves that are used to focus light onto a spot on the surface of the disk, as understood by those skilled in the art. The use of zone plate 130 on the top surface 142 is advantageous because it avoids the difficult process of manufacturing a refractive lens. However, because evanescent waves are used in this embodiment and evanescent waves decay very rapidly, it is necessary for lens module 102 to be kept very close, less than approximately $\lambda/4$, to the media upon which it is focusing light.

Using ordinary photolithographic techniques, there is a lower practical limitation of the printing resolution of approximately 0.25 microns. The use of direct electron-beam ("e-beam") writing allows much smaller geometric resolution to be achieved. The lower limit is about 20 nm or 0.02 microns. This is a significant improvement over photolithography.

The use of e-beam writing is possible because the area required to e-beam write is small. The area of the zone plate is approximately 10×10 mils (i.e., 1 mil is 1/1000th of an inch). Head slider 100 dimensions are approximately 50×100 mils. Thus, the zone plate area is below 2 percent of the slider area.

Zone plate 130 can be designed to give high numerical apertures (i.e., NA) which will also decrease the diameter of the Airy spot by decreasing the focal length of the diffractive lens. The effective NA of a zone plate may be very high, such as 0.85 to 0.95. These high NAs are difficult to achieve with refractive optics, which are typically 0.4 to 0.5. The net result of a zone plate with an occluded center and a high effective NA is to create a small spot with a size equivalent to that produced by a refractive lens with a very high index of refraction and high NA.

The above detailed properties can be modified to suit specific applications, but the advantages of small spot size (i.e., high data storage density) and adjustable focal lengths (i.e., no fly height limitations) still remain.

Figure 12A:
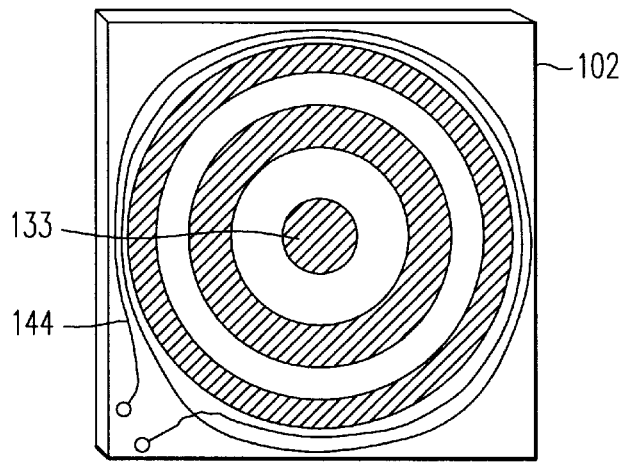
FIG. 12A illustrates in plan view a zone plate lens with a zone plate and magnetic coils.

Lens module 102 may also carry a coil for forming a magnetic field if the lens is to be used on a magneto-optic disk. In the embodiment in which the center region 133 of zone plate 130 is opaque, center region 133 can carry a coil for forming a magnetic field. Otherwise, magnetic coils 144 may be placed around the outside of zone plate 130 or other diffractive optic structures as shown in FIG. 12A.

Figure 12B:
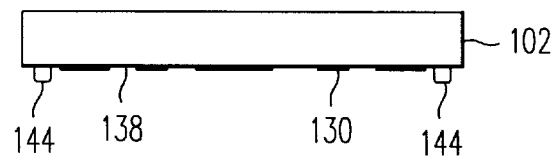
FIG. 12B illustrates in side view a zone plate lens module with the zone plate on the bottom surface with magnetic coils.

FIG. 12B shows magnetic coils 144 located on the bottom surface 138 of the lens module 102, along with zone plate 130. It is necessary to ensure that the focused optical spot created by zone plate 130 can reach the magneto-optic layer without magnetic coils 144 interfering with the flight of head 100 in the head slider embodiment. For example, if zone plate 130 has a focal length of 15 microns, magnetic coils 144 can be several microns thick to achieve the low coil resistance desired. Along with insulating and passivation layers, each of which is on the order of a micron thick, the coil assembly is approximately 6 to 8 microns thick. Thus, there is approximately 7 microns between the coil and the surface of the disk. This is adequate to ensure that the flying conditions established by air bearing surfaces 108 and 110 of slider 100 are undisturbed by coil 144.

Figure 12C:
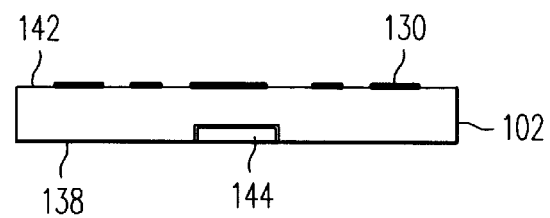
FIG. 12C illustrates in side view a zone plate lens with the zone plate on the top surface with magnetic coils recessed into the lens module.

However, if zone plate 130 is located on the top surface 142 of lens module 102 as shown in FIG. 12C, magnetic coils 144 should be recessed into bottom surface 138 of lens module 102. As discussed above, when zone plate 130 is on the top surface 142 of lens module 102, lens module 102 uses evanescent waves to produce a spot of light on the surface of a disk. Thus, the flight of head 100 is limited to about $\lambda/4$, which is approximately 0.16 microns for light in visible wavelengths. A magnetic coil assembly that is 6 to 8 microns thick will interfere with the flight of head 100. Accordingly, magnetic coils 144 should be recessed into lens module 102, thus, ensuring that the focused optical spot created by zone plate 130 can reach the magneto-optic layer over the range of flying head conditions encountered.

Figure 13A:
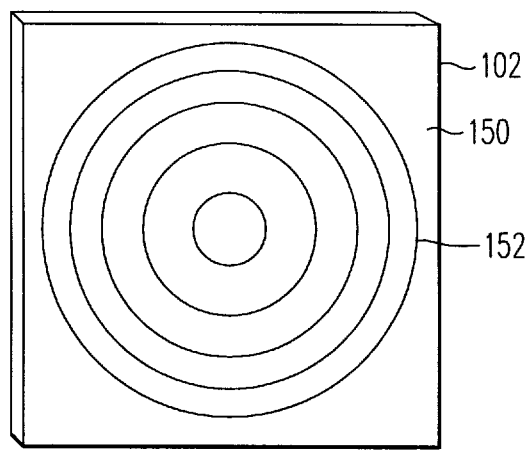
FIGS. 13A and 13B illustrate in plan view and in side view, respectively, a phase zone plate lens.
Figure 13B:
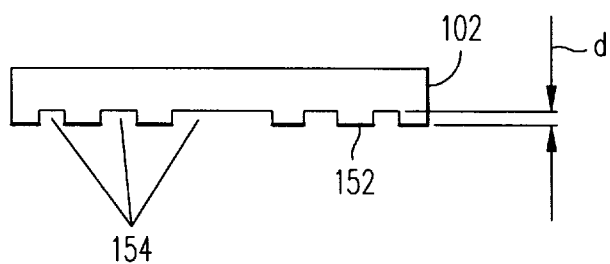

In another embodiment, instead of using a zone plate as diffractive optical structure 114, a phase zone plate as shown in FIG. 13A, may be used. Similar to zone plate 130, a phase zone plate 150 comprises a series of concentric rings 152. However, rings 152 of phase zone plate 150 are all transparent, with alternating rings recessed a depth d into glass lens module 102 with a refractive index of n. Thus, because phase zone plate 150 has no opaque zones, it can provide more light into the focal spot than zone plate 130. FIG. 13B shows a side view of lens module 102 with alternating rings 152 recessed. The recessed rings 154 induce a $\pi/2$ phase shift. The depth d of the recess is found by the following formula:

$$d = \lambda/4(n-1) \qquad (10)$$

Figure 14:
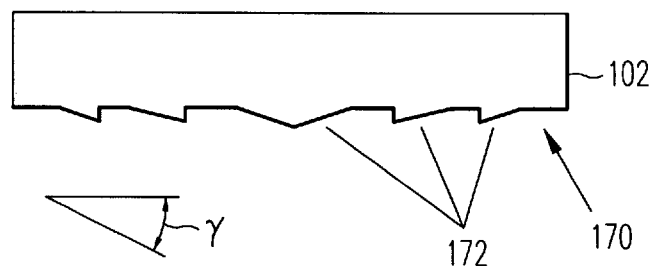
FIG. 14 illustrates in side view a blazed phase zone plate lens.

In another embodiment phase zone plate 150 is modified by blazing. FIG. 14 shows the side of lens module 102 with a blazed phase zone plate 170. Similar to phase zone plate 150, blazed phase zone plate 170 consists of concentric rings, with alternating rings 172 recessed into lens module 102. Alternating rings 172 are blazed such that the face of rings 172 are at an angle $\gamma$ with bottom surface 138 of lens module 102. In this embodiment, the blazed face of rings 172 act as prisms, and the angles are determined to maximize the light intensity into the central diffraction peak. As discussed above, a diffractive optic structure has primary and sub-primary focal lengths. Unlike zone plates, however, the irradiance at the sub-primary focal length for a blazed phase zone plate may be increased by changing the angle $\gamma$ of blazing. Thus, the sub-primary focal lengths may be used in the blazed phase zone plate embodiment to take advantage of the smaller spot sizes of the sub-primary focal lengths, without losing irradiance. Such calculations are carried out by means known to those skilled in the art. Details concerning diffraction phenomena relating to zone plates, phase zone plates and blazed phase zone plates are described in "Optics," by E. Hecht, Addison-Wesley Publishing Co., 1987, 2nd ed, which is herein incorporated by reference; "Introduction to Modern Optics," by G. Fowles, Dover Publications, Ind., 1975, 2nd ed, which is herein incorporated by reference; and "Introduction to Classical and Modern Optics," by J. Meyer-Arendt, Prentice-Hall, Inc., 1972, which is herein incorporated by reference.

In both the phase zone plate and blazed phase zone plate embodiments, the diffractive optic structure may be either on the bottom surface 138 of lens module 102 or the top surface 142 in the same manner as the zone plate. In addition, because neither of these embodiments have an occluded zone, the light incident on the phase zone plate and the blazed phase zone plate may be uniform. Thus, optic structure 116 used in the zone plate embodiment to create an incident ring of light is unnecessary.

Method of Making Head Slider with Diffractive Lens

The process for making head slider 100 with a zone plate lens will be described. The process of making a phase zone plate and blazed phase zone plate will also be described.

Figure 15A:
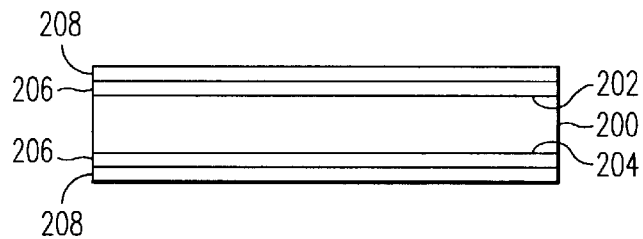
FIGS. 15A–15S illustrate the manufacturing process of a head slider with a diffractive optic structure, such as a zone plate lens.

The process is started, as shown in FIG. 15A, by sputtering on both the top surface 202 and the bottom surface 204 of a fused silica glass substrate 200 a layer of adhesion chromium 206 (e.g., 30 nm), followed by a sputtered layer of gold 208 (e.g., 500 nm) without breaking vacuum. Sputter cleaning (etching) is advisable prior to the metal deposition described above. This metal layer will be used to protect the substrate from the glass etching solution. When this metal composite is patterned, it will be used as an etch mask during the etching of the glass.

Figure 15B:
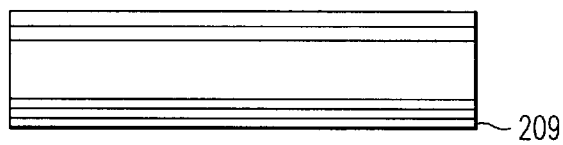
Figure 15C:
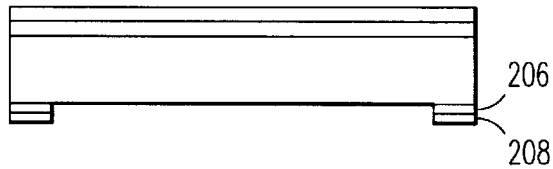

The silica substrate 200 (preferably circular in shape) has photo resist 209 spun on one face as shown in FIG. 15B. This face is patterned by a mask which contains the air bearing surface ("ABS") design and street markings used as a sawing guide to separate slider head modules. The exposed chromium-gold (i.e., CrAu) layers 206 and 208 are dissolved by wet etch means, that is well known in the art, leaving the ABS protected by a chromium-gold pattern which is the glass etch mask as shown in FIG. 15C.

Figure 15D:
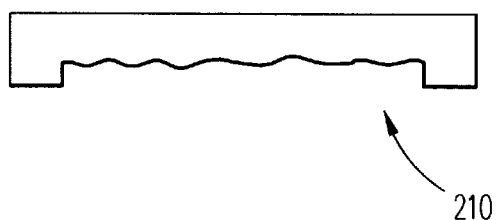

Using a hydrofluoric acid/water mixture or a buffered oxide etch ("BOE") at or near room temperature, the ABS patterned substrate 200 is then etched to a depth of approximately 15 microns. The chromium-gold glass etch mask is then removed as shown in FIG. 15D leaving the ABS face 210.

The use of fused silica as substrate 200 has advantages over glass containing materials in addition to silicon dioxide. First, the thermal expansion of fused silica is much smaller than most composite glasses, giving thermal stability to the geometric patterns formed on the fused silica. Second, the fluoride ion used in etching forms a gaseous or liquid etching product, which dissolves in the etchant, leaving specular etched surfaces on the fused silica substrate. Additional composite materials (e.g., boron oxide, aluminum oxide, etc.) may not etch at the same rate as silicon dioxide and may yield insoluble or gel-like etching products which act as unwanted masking. These effects can yield non-specular etched substrate surfaces.

Method of Making Zone Plate Lens

Undercutting the chromium-gold mask occurs in an isotropic fashion; namely, the lateral undercut is about equal to the depth of etch, where the dimensions of open etched areas are large compared to the etch depth. The etched fused silica substrate 200 surface must remain flat because electron-beam ("e-beam") writing of the zone plate requires a flat plane to a small fraction of a wavelength.

Figure 15E:

A white light interferometer, such as the type manufactured by Zygo Corp., can give a profile resolution measurement better than 10 nm. After measurement, an excimer laser can be used to ablate the profile of the zone plate area 212 and bring it into a plane (i.e., planarize) parallel to the top 202 of substrate 200 as shown in FIG. 15E. The planarizing is done only over the surface area 212 which will contain the zone plate. The etched silica surface is then flat and sufficiently specular to construct the coil without further processing. This is an appreciable advantage.

Figure 15F:
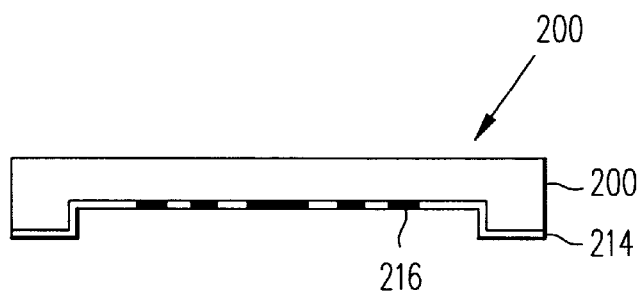

The next step after planarizing the zone plate area 212 is to sputter coat the entire substrate 200 ABS face 210 with a chromium layer 214 (i.e., 20 nm) and e-beam direct write the zone plate pattern 216 in chrome layer 214 as shown in FIG. 15F.

Method of Making Magnetic Coils

Figure 15G:
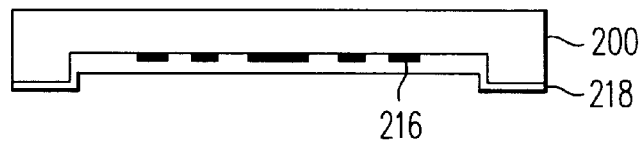
Figure 15H:
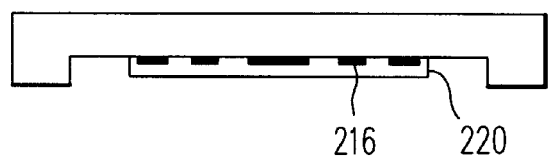

Next, a polyamide layer 218 is spun over substrate 200 and a cap mask is applied to pattern a polyamide protective cap 220 over the zone plate pattern 216 as shown in FIG. 15G. The excess polyamide is removed leaving a protective cap 220 as shown in FIG. 15H. The protective cap 220 will protect zone plate pattern 216 from the subsequent processing.

Figure 15I:
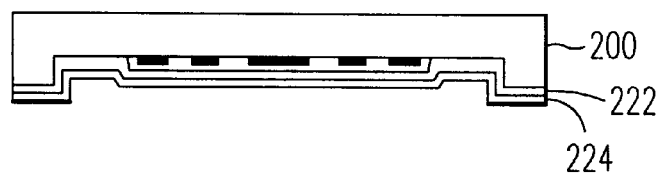
Figure 15J:
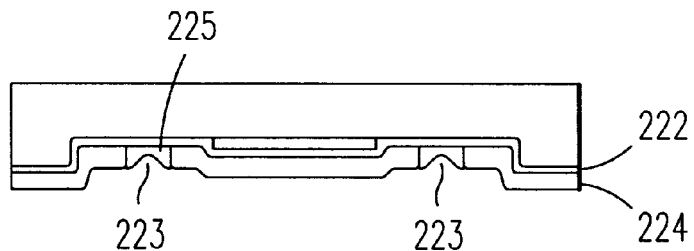
Figure 15K:
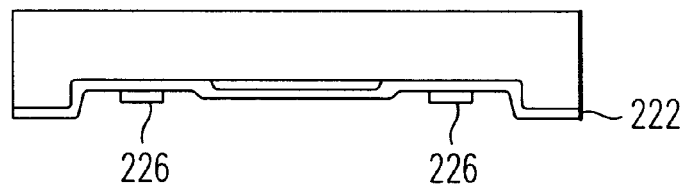
Figure 15L:
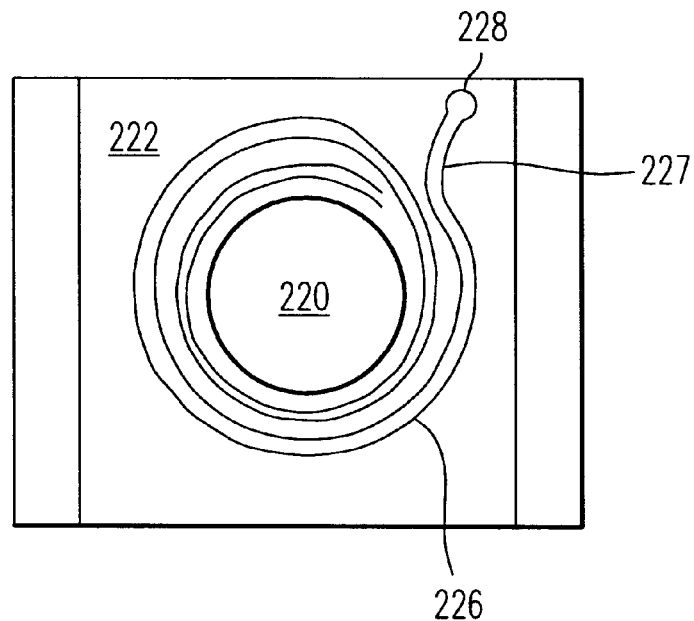
Figure 15M:
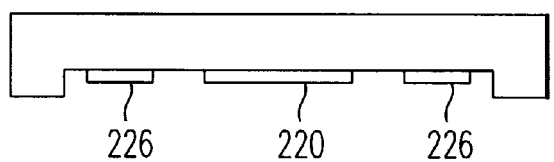

The magnetic coil is formed around zone plate 216 by the following process. A plating base 222 of chromium-gold is sputtered (e.g., 30 nm Cr, 200 nm Au) on the ABS face 210 of substrate 200. A thick resist 224, such as resist manufactured by Shipley, is spun onto the ABS face 210 of substrate 200 as shown in FIG. 15I. This resist is patterned such that there are 6 micron high by 3 micron wide coil patterns 223 with 2 micron spaces. A copper or gold layer 225 is then plated up on ABS face 210 to a thickness of 3 to 4 microns, forming the coil turns, as shown in FIG. 15J. The resist is removed leaving coils 226 as shown in FIG. 15K. FIG. 15L shows a plan view of substrate 200 with polyamide cap 220 and coils 226 with one lead 227 going to a pad 228 on plating base 222. The thin plating base 222 is etched off with no appreciable damage to coils 226 or polyamide protective cap 220 as shown in FIG. 15M. In another embodiment, magnetic coils 226 may be placed in the occluded center zone of zone plate 216 on the polyamide cap 220 using the same process.

Figure 15N:
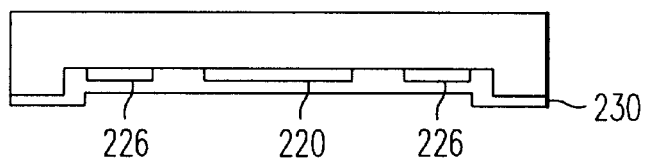

Next, a protective electrical insulator 230 is CVD deposited over coils 226 (and everything else) on ABS face 210 as shown in FIG. 15N. Insulator 230 can be an oxynitride with low stress (e.g., 90% oxide, 10% nitride, having a stress in the $10^8$ dyne/cm range) Such an oxynitride adheres to silica, gold, and polyamide and is deposited at 250° C. which is compatible with all the above materials. Insulator 230 is used to allow a second coil lead to bridge over coil turns 226.

Figure 15O:
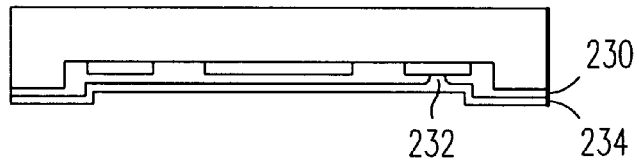
Figure 15P:
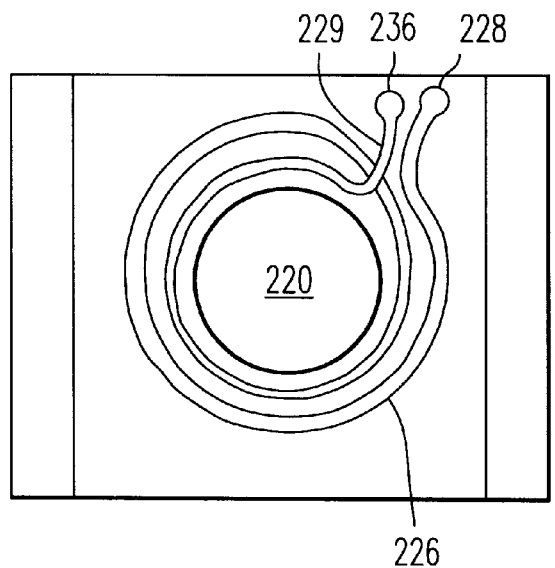
Figure 15Q:
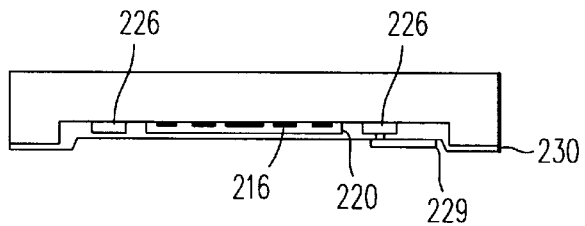

A via 232 is now formed through oxynitride insulator 230 to the innermost coil as shown in FIG. 15O. This via process is standard and uses either a wet etch or plasma etch. ABS face 210 is now sputtered with a chromium-gold layer 234 (i.e., 30 nm Cr. 500 nm Au) as shown in FIG. 15O. A second lead 229 that connects to the innermost coil through via 232 is formed in a chromium-gold layer 234 by the usual resist patterning and etching away the unwanted chromium-gold layer. Second coil lead 229 connects electrically to the innermost coil and extends over coil turns 226 without electrically contacting coil turns 226. Second lead 229 then terminates in a pad 236 as shown in FIG. 15P. Note that the oxynitride insulator 230 and polyamide cap 220 are still protecting coil turns 226 and zone plate 216, as shown in FIG. 15Q.

Figure 15R:
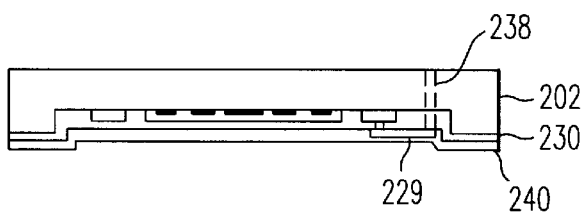

A final oxynitride layer 240 can be deposited over the entire ABS face 210 after coil lead contacts are made by etching or drilling holes 238 through silica substrate 200 as shown in FIG. 15R in order to passivate the structure.

Figure 15S:
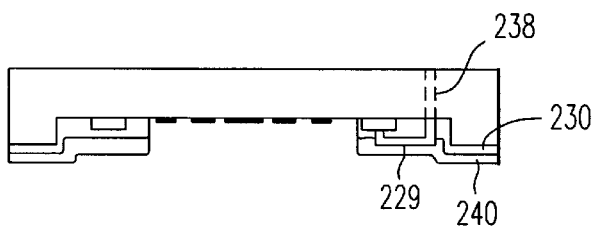

The zone plate oxynitride 230 and polyamide protective layers 220 are removed by known processes, thus fully exposing zone plate 216 and coil pads 228, 236. Using shadow masks with chromium-gold sputtering on both faces, as is well known to those skilled in the art, provides electrical conductivity through substrate 200 and allows electrical contact to be made from the top surface 202 of substrate 200 through hole 238 to coil pads 228, 236 as shown in FIG. 15S. The entire structure is now ready to be separated into strips for processing the ABS face 210 to the required height and flatness and final separation into head sliders.

Method of Making Phase Zone Plate Lens

Figure 16A:
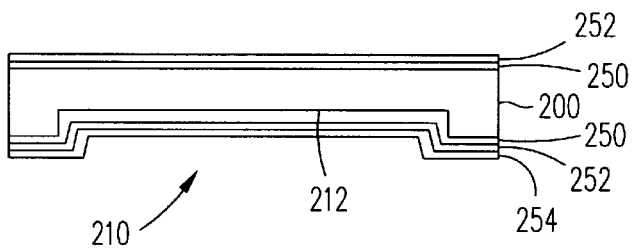
FIGS. 16A–16C illustrate the manufacturing process of a phase zone lens.
Figure 16B:
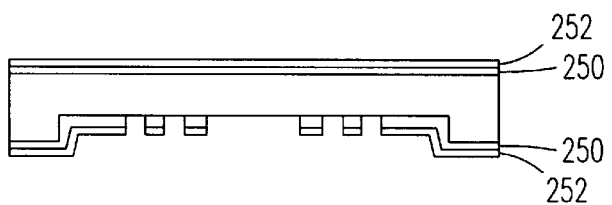
Figure 16C:
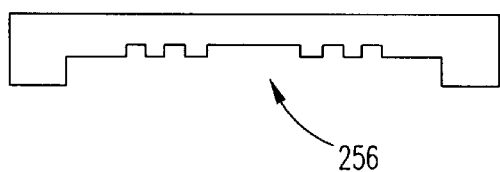

As an alternative to a zone plate, a phase zone plate may be patterned onto area 212. This is done in the same manner in which the ABS face 210 was created on substrate 200. A layer of adhesion chromium 250 (e.g., 30 nm), is sputtered on ABS face 210 of substrate 200 followed by a sputtered layer of gold 252 (e.g., 500 nm). A layer of photo resist 254 is spun over the chromium-gold layers 250, 252, as in FIG. 16A. The photo resist face is patterned with a phase zone plate mask. The exposed chromium-gold layers 250, 252 are dissolved by known wet etch means, leaving the phase zone plate protected by a chromium-gold pattern which is the glass etch mask as in FIG. 16B. The phase zone plate patterned substrate is then etched in a hydrofluoric acid/water mixture or by using a buffered oxide etch. The chromium-gold glass etch mask is then removed leaving the phase zone plate 256 as shown in FIG. 16C.

Method of Making Blazed Phase Zone Plate Lens

Figure 17A:
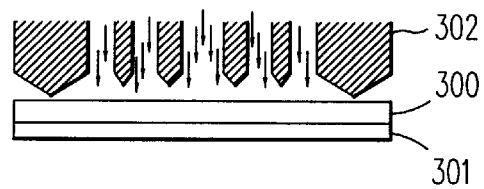
FIGS. 17A–17E illustrate the manufacturing process of a blazed phase zone lens.
Figure 17B:
Figure 17C:
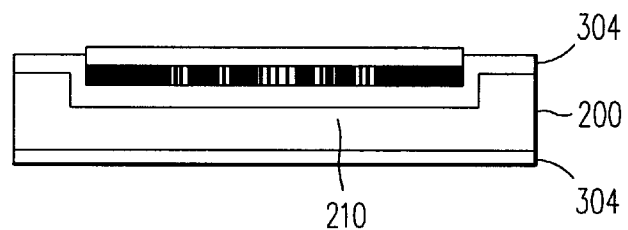
Figure 17D:
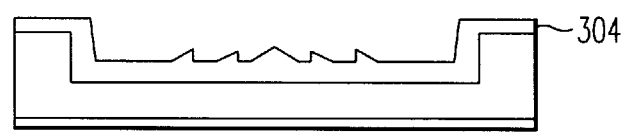
Figure 17E:

Alternatively a blazed phase zone plate may be patterned onto area 212. A blazed phase zone plate may be created by etching steps approximating the slope of the blazed surface. This is accomplished by using four to eight masks, and etching increasing depths to approximate the slope of the blazed surface. Another approach is to create a gray scale mask in a substrate such as a high energy beam sensitive glass (HEBS) as described in U.S. Pat. No. 5,078,771, issued to C. Wu on Jan. 7, 1992, which is herein incorporated by reference; and is described in the paper entitled "Cost Effective Mass Fabrication of Multilevel Diffractive Optical Elements Using a Single Optical Exposure with a Gray-Scale Mask on High Energy Beam Sensitive Glass," by Walter Daschner, et al., from University of California San Diego, November/December Journal of American Vacuum Society, 1996, which is herein incorporated by reference; and the publication "HEBS-Glass Photomask Blanks," from Canyon Materials, Inc., CMI Product Information No. 96-01, which is herein incorporated by reference. A glass substrate 300 is diffused with silver to a depth of 3–4 microns in layer 301, as shown in FIG. 17A. Glass substrate 300 is doped with a photo inhibitor to make substrate 300 inert to ultraviolet light or light of shorter wavelengths, but reactant to high energy beams, e.g., an e-beam greater than 10 kv. The blazed phase zone plate mask is directly written on substrate 300 with an e-beam 302 as a function of gray scale as shown in FIG. 17A. In this manner a gray scale mask is generated as shown in FIG. 17B. A thick layer of resist 304, such as Shipley S1650, is spun over substrate 200 to a thickness of approximately 6 microns, as shown in FIG. 17C. The gray scale mask is used to expose the thick resist layer 304 over ABS face 210 of substrate 200 as shown in FIG. 17C. In this manner the gray scale from substrate 300 is transferred to a vertical dimension in resist 304 as shown in FIG. 17D. Substrate 200 is then etched using, for example, chemically assisted ion beam etching ("CAIBE"), which etches through the resist and into the substrate. The CAIBE etches into substrate 200 a representation of the gray scale mask 300, leaving a blazed phase zone plate 306 in substrate 200 as shown in FIG. 17E. Of course, zone plate 216 and phase zone plate 256 may be manufactured in a similar process.

Another Embodiment of Making Head Slider with Diffractive Optic Structure

Another embodiment of making head slider 100 results in a structure similar to that of the above embodiment, but through a different manufacturing process.

The zone plate structure is directly written with an e-beam as in the above embodiment onto a fused silica optical flat substrate 400. Other diffractive optic structures, such as phase zone plate or blazed phase zone plate, may also be placed on the silica substrate 400 as described in the above embodiments. No etching of the ABS face is done in this process. The zone plate 402 is protected by a polyamide cap 404 as in the above embodiment. The coil turns 406 are created around zone plate 402 as in the above embodiment.

Figure 18A:
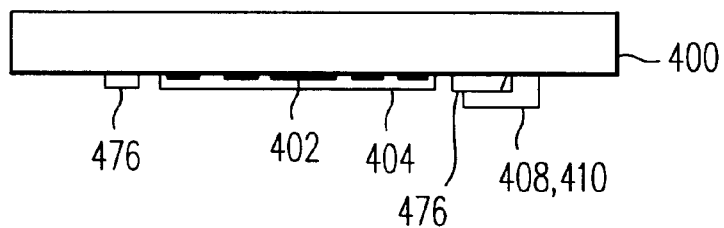
FIGS. 18A–18D illustrate an alternative method of manufacturing a head slider with a diffractive optic structure.

At this point in the process, the optical flat silica substrate 400 has zone plate 402 with polyamide cap 404 surrounded by coil turns 406 with leads 408, 410 as shown in FIG. 18A. It is noted that the second lead 410 from the innermost coil is insulated from coil turns 406, and terminates on a pad 412 (not shown) as in the above embodiment.

Figure 18B:
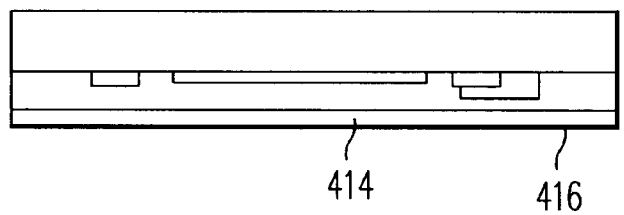

The ABS structures are formed by depositing a low stress film (e.g., 90% oxide, 10% nitride, having a stress in the 10 dyne/cm range) to a thickness which is several microns larger than the final required thickness (eg., final thickness is 15 microns as in the above embodiment), as shown in FIG. 18B. The low stress film allows the deposition to be carried out over the coils and the zone plate cap without adhesion problems.

Figure 18C:
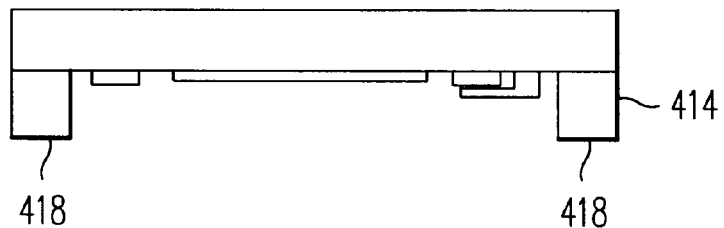
Figure 18D:
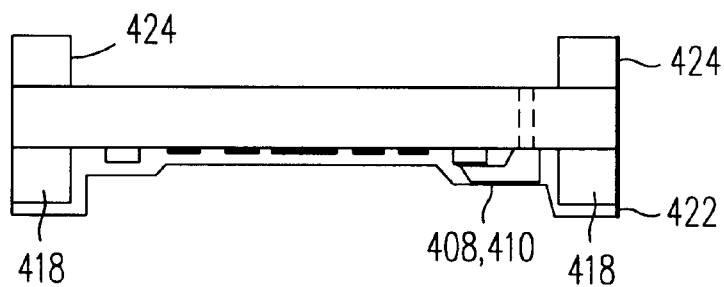

Thick film resist 416 is applied over the entire surface as shown in FIG. 18B. Resist 416 is patterned with the ABS pattern and developed. The exposed oxynitride film 414 is then removed by either wet or dry etching, leaving the ABS structures 418 in the oxynitride film 414 as shown in FIG. 18C.

The ABS structures 418 are processed to the required height and flatness. Zone plate cap 404 is removed. Coil leads 408, 410 are electrically connected to the top surface 420 of substrate 400, as described in the above embodiment. The flying head structure can finally be passivated by a thin layer of oxynitride 422 and substrate 400 diced into final shape. To balance out any residual stresses from the oxynitride ABS structures 418, a mirror image ABS structure 424 can be formed on the other face of substrate 400. This will allow substrate 400 to assume its original flat figure, and thus allow zone plate 402 to function normally.

Figure 19:
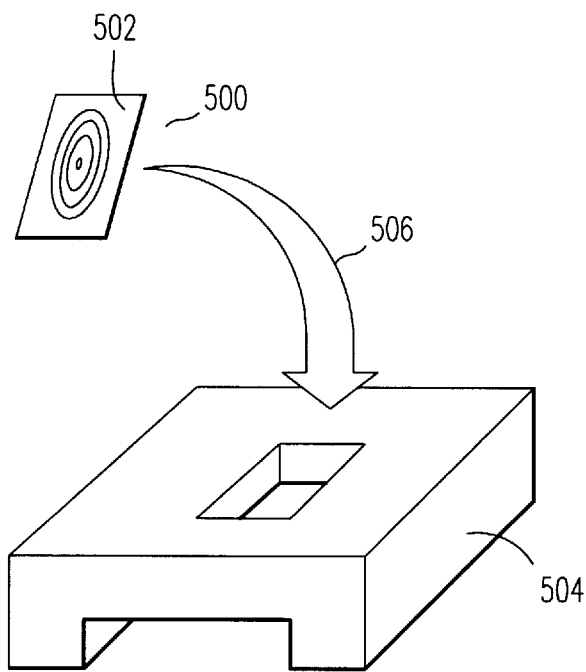
FIG. 19 illustrates a lens with a diffractive optical structure being mounted on an already manufactured head slider.
Figure 20:
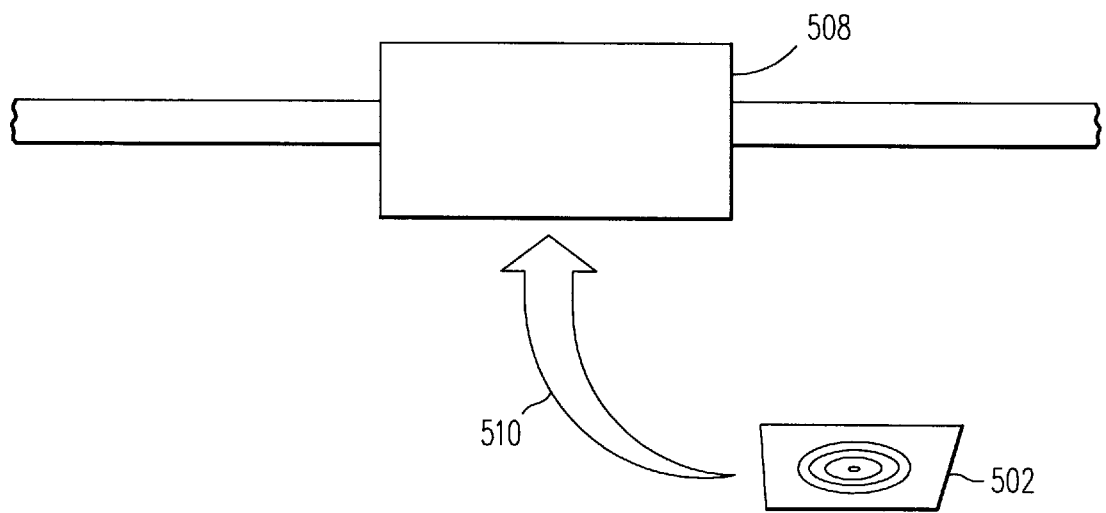
FIG. 20 illustrates a lens with a diffractive optical structure being mounted on an already manufactured optical mechanical assembly.

A lens 500 with a diffractive optic structure 502 may also be manufactured separately in a manner similar to the embodiments described above. Lens 500 may then be mounted on an already manufactured head slider 504 as illustrated by arrow 506 in FIG. 19 or an already manufactured OMA 508 as illustrated by arrow 510 in FIG. 20.

While the invention has been described with respect to specific embodiments, those skilled in the art will appreciate that changes can be made in form and detail without departing from the spirit and scope of the invention. For example, the head slider can be made from any appropriate material. The zone plate can be made of any appropriate material that is transparent to light having the wavelength being used. The opaque material formed on the zone plate can be any suitable opaque material. The lens module can include another diffractive or non-diffractive element, either formed integrally or appended (i.e. joined) to the basic structure. Accordingly, all such changes come within my invention.

What is claimed is:

1. A structure comprising:
a slider for flying above a data recording medium;
a diffractive grating focusing optical element formed on said slider, said slider having an air breathing surface, said optical element for focusing light from a laser beam onto said recording medium;
wherein said optical element is a diffractive zone plate, said zone plate comprising concentric ring-shaped optical regions for focusing light onto a small spot on said recording medium and a circular opaque region formed in the center of said ring-shaped opaque regions; and
a coil formed at said circular opaque region for generating a magnetic field.

2. A structure comprising:
a source of a laser beam;
a slider for flying above a data recording medium; and
a diffractive grating focusing optical element formed on said slider, said slider having an air bearing surface, said optical element for focusing light from a laser beam onto said recording medium, wherein the primary mechanism by which light is focused by said optical element is diffraction, and wherein said recording medium is a magneto-optic disk, space being provided between said source of said laser beam and said diffractive grating focusing optical element so that said source of said laser beam and said diffractive grating focusing optical element are not directly thermally coupled to one another.

3. A structure comprising:
a source of a laser beam;
a slider for flying above data recording medium; and
a diffractive grating focusing optical element formed on said slider, said slider having an air bearing surface, said optical element for focusing light from said laser beam onto said recording medium, wherein the primary mechanism by which light is focused by said optical element is diffraction, and wherein said light emerging from said diffractive grating focusing optical element is principally non-evanescent, space being provided between said source of said laser beam and said diffractive grating focusing optical element so that said source of said laser beam and said diffractive grating focusing optical element are not directly thermally coupled to one another.

4. Structure of claim 3 wherein said optical element is a diffractive zone.

5. Structure of claim 3 wherein said recording medium is an optical disk.

6. Structure of claim 3 wherein said optical element is mounted on the top surface of said slider.

7. Structure of claim 1 wherein said optical element is a phase zone plate.

8. Structure of claim 1 wherein said optical element is a blazed phase zone plate.

9. Structure of claim 1 wherein said optical element is mounted on the bottom surface of said slider.

10. Structure of claim 1, 13, or 27 wherein said diffractive grating focusing optical element is formed on the top side of said slider.

11. Structure of claim 1, 10, or 11 wherein said diffractive grating focusing optical element is formed on the bottom side of said slider.

12. Structure of claim 4 wherein said zone plate comprises concentric ring-shaped opaque regions for focusing said light onto a small spot on said recording medium.

13. Structure of claim 12 wherein said zone plate includes a circular opaque region formed in the center of said ring-shaped opaque regions.

14. A structure comprising:
a source of a laser beam;
an optical mechanical assembly above a data recording medium; and
a diffractive grating focusing optical element mounted on said optical mechanical assembly for focusing principally non-evanescent light from a laser beam onto said recording medium, wherein the primary mechanism by which light is focused by said optical element is diffraction, space being provided between said source of said laser beam and said diffractive grating focusing optical element so that said source of said laser beam and said diffractive grating focusing optical element are not directly thermally coupled to one another.

15. Method comprising the steps of:
forming a light focusing lens on a substrate;
occluding a region of said lens to reduce the size of the light spot formed by said lens; and
wherein at the conclusion of said method, said lens is on a slider, said slider having an air bearing surface for flying above a recording medium.

16. Method of claim 15 further comprising the step of forming said substrate into a slider by etching so that a portion of said substrate remaining after said step of etching serves as an air bearing surface for said slider.

17. Method comprising the steps of:

forming a diffractive grating optical focusing element on a substrate; and etching said substrate so that at the conclusion of said step of etching, a portion of said substrate remains as an air bearing surface for flying above a data recording medium, wherein said step of forming a diffractive grating optical focusing element comprises the steps of:
depositing opaque material on said substrate; and
patterning said opaque material to from said diffractive grating optical focusing element, said method further comprising the step of mounting a laser beam source to provide a laser beam that passes through said diffractive grating optical focusing element, space being provided between said laser beam source and said diffractive grating optical focusing element so that said laser beam source and said diffractive grating optical focusing element are not directly thermally coupled to one another.

18. Method comprising the steps of:

forming a diffractive grating optical focusing element on a substrate; and etching said substrate so that at the conclusion of said step of etching, a portion of said substrate remains as an air bearing surface for flying above a data recording medium, wherein said step of forming said diffractive grating optical focusing element comprises the steps of:
forming a mask on said substrate;
patterning said mask to expose portions of said substrate; and
etching said exposed portions of said substrate to form a phase zone plate in said substrate, said method further comprising the step of mounting a laser beam source to provide a laser beam through said diffractive grating optical focusing element, space being provided between said laser beam source and said diffractive grating optical focusing element so that said laser beam source and said diffractive grating optical focusing element are not directly thermally coupled to one another.

19. Method comprising the steps of:

forming a diffractive grating optical focusing element on a substrate; and etching said substrate so that at the conclusion of said step of etching, a portion of said substrate remains as an air bearing surface for flying above a recording medium, wherein said step of forming a diffractive grating optical focusing element comprises the steps of:
forming a mask on said substrate;
patterning said mask; and
transferring the pattern in said mask to said substrate to thereby form a blazed zone diffractive grating optical element, said method further comprising the step of mounting a laser beam source to provide a laser beam through said diffractive grating optical focusing element, space being provided between said laser beam source and said diffractive grating optical focusing element so that said laser beam source and said diffractive grating optical focusing element are not directly thermally coupled to one another.

20. Method for making a zone plate for focusing light comprising:

forming a patterned layer of opaque material on a transparent substrate, said patterned layer of opaque material forming said zone plate and focusing principally non-evanescent light; and wherein at the conclusion of said method, said zone plate is on a slider, said slider having an air bearing surface for flying above a recording medium.

21. Method of claim 20 further comprising the step of mounting said zone plate on a slider.

22. Method of claim 20 further comprising the step of selectively etching said substrate to form a slider.

23. A structure comprising:

a slider for flying above a data recording medium;

a diffractive grating focusing optical element on said slider, said slider having an air bearing surface, said optical element for focusing light from a laser beam onto said recording medium, a centrally located portion of said diffractive grating focusing optical element being occulded so as to reduce the size of a spot of light focused by said optical element on said data recording medium, wherein said diffractive grating focusing optical element is a blazed zone plate.

24. A structure comprising:

a slider for flying above a data recording medium;

a diffractive grating focusing optical element on said slider, said slider having an air bearing surface, said optical element for focusing light form a laser beam onto said recording medium, a centrally located portion of said diffractive grating focusing optical element being occluded so as to reduce the size of a spot of light focused by said optical element on said data recording medium, wherein said diffractive grating focusing optical element is a phase zone plate.

25. A structure comprising:

a slider for flying above a data recording medium;

a diffractive grating focusing optical element on said slider, said slider having an air bearing surface, said optical element for focusing light form a laser beam onto said recording medium, a centrally located portion of said diffractive grating focusing optical element being occluded so as to reduce the size of a spot of light focused by said optical element on said data recording medium, wherein said diffractive grating focusing optical element comprises a set of opaque and non-opaque regions for diffracting light.

26. A structure comprising:

a slider for flying above a data recording medium;

a diffractive grating focusing optical element on said slider, said slider having an air bearing surface, said optical element for focusing light form a laser beam onto said recording medium, a centrally located portion of said diffractive grating focusing optical element being occluded so as to reduce the size of a spot of light focused by said optical element on said data recording medium, and an optical element for receiving a beam of light and selectively transmitting said light to a poriton of said diffractive grating focusing optical element that is not occluded.

27. Structure of claim 26 wherein said optical element for receiving a beam of light is an axicon lens.

28. A structure comprising:

a data recording media;

a diffractive grating focusing optical element for focusing principally non-evanescent light on said data recording medium, said diffractive grating focusing optical element comprising a centrally located occluded region for reducing the size of a spot of light focused by said diffractive grating focusing optical element on said data recording medium; and a laser source for providing a laser beam to said diffractive focusing optical element, whereby said laser beam is focused on said data recording medium, space being provided between said laser source and said diffractive grating focusing optical element so that said laser source and said diffractive grating focusing optical element are not directly thermally coupled to one another.

29. A structure comprising:

a magneto-optic data recording medium;

a laser source for providing a laser beam; and a diffractive grating focusing optical element for receiving said laser beam and focusing said laser beam onto said magneto-optic data recording medium, wherein the primary mechanism by which light is focused by said optical element is diffraction, space being provided between said laser source and said optical element so that said laser source and said optical element are not directly thermally coupled to one another.

30. Structure of claim 29 wherein said optical element is non-evanescent.

31. Structure of claim 29 further comprising a magnetic field source for generating a magnetic field at said medium so that data can be recorded in said medium.

32. Structure of claim 29 wherein said diffractive grating focusing optical element comprises a centrally located occluded region for reducing the size of a spot of light focused onto said magneto-optic data recording medium by said diffractive grating focusing optical element.

33. Method for making a non-evanescent optical element for focusing light comprising:

depositing a mask on a transparent substrate;

defining a pattern in said mask; and etching a first portion of said transparent substrate in accordance with said pattern to form a diffractive grating structure that focuses principally non-evanescent light onto a spot, wherein the primary mechanism by which light is focused by said diffractive grating structure is diffraction;

wherein at the conclusion of said method, said diffractive grating structure is on a slider, said slider having an air bearing surface for flying above a recording medium, and a laser beam source is mounted to provide a laser beam that passes through said diffractive grating structure, space being provided between said laser beam source and said diffractive grating system so that said laser beam source and said diffractive grating structure are not directly thermally coupled to one another, and wherein said diffractive grating structure is a phase zone plate.

34. Method for making a non-evanescent optical element for focusing light comprising:

depositing a mask on a transparent substrate;

defining a pattern in said mask; and etching a first portion of said transparent substrate in accordance with said pattern to form a diffractive grating structure that focuses principally non-evanescent light onto a spot, wherein the primary mechanism by which light is focused by said diffractive grating structure is diffraction;

wherein at the conclusion of said method, said diffractive grating structure is on a slider, said slider having an air bearing surface for flying above a recording medium, and a laser beam source is mounted to provide a laser beam that passes through said diffractive grating structure, space being provided between said laser beam source and said diffractive structure so that sad laser beam source and said diffractive grating structure are not directly thermally coupled to one another, and wherein said diffractive grating structure is a blazes zone plate.

* * * * *